(12) United States Patent
Rakshit et al.

(10) Patent No.: US 10,796,721 B1
(45) Date of Patent: Oct. 6, 2020

(54) ADVANCED AIR BEARING SLIDER

(71) Applicant: Seagate Technology LLC, Cupertino, CA (US)

(72) Inventors: Abhik Rakshit, Eden Prairie, MN (US); Jiaxi Lu, Lakeville, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 16/379,910

(22) Filed: Apr. 10, 2019

Related U.S. Application Data

(60) Provisional application No. 62/655,336, filed on Apr. 10, 2018.

(51) Int. Cl.
*G11B 21/21* (2006.01)
*G11B 5/60* (2006.01)
*G11B 17/32* (2006.01)

(52) U.S. Cl.
CPC ............ *G11B 21/21* (2013.01); *G11B 5/6005* (2013.01); *G11B 5/6082* (2013.01); *G11B 17/32* (2013.01)

(58) Field of Classification Search
None
See application file for complete search history.

(56) References Cited

U.S. PATENT DOCUMENTS

| | | | | |
|---|---|---|---|---|
| 4,420,780 A | * | 12/1983 | Deckert | G11B 5/6005 360/122 |
| 4,951,121 A | | 8/1990 | Furukawa et al. | |
| 5,808,184 A | * | 9/1998 | Boutaghou | G01B 5/28 73/105 |
| 6,188,547 B1 | | 2/2001 | Gui et al. | |
| 6,443,813 B1 | * | 9/2002 | Strom | G11B 5/102 125/12 |
| 6,445,543 B1 | | 9/2002 | Gui et al. | |
| 6,504,682 B1 | | 1/2003 | Samino et al. | |
| 6,515,831 B1 | | 2/2003 | Samino et al. | |
| 6,560,071 B2 | | 5/2003 | Chapin et al. | |
| 6,606,222 B1 | | 8/2003 | Ryun | |
| 6,661,611 B1 | | 12/2003 | Samino et al. | |
| 6,934,122 B2 | * | 8/2005 | Boutaghou | G11B 5/6082 360/235.5 |
| 6,989,967 B2 | * | 1/2006 | Pendray | G11B 5/6005 360/236.5 |
| 7,245,455 B2 | * | 7/2007 | Rajakumar | G11B 5/6005 360/235.8 |
| 7,256,965 B2 | | 8/2007 | Rao et al. | |
| 7,417,828 B2 | | 8/2008 | Boutaghou et al. | |
| 7,477,486 B1 | | 1/2009 | Sun et al. | |
| 7,616,405 B2 | | 11/2009 | Hu et al. | |
| 7,719,795 B2 | | 5/2010 | Hu et al. | |
| 7,916,426 B2 | | 3/2011 | Hu et al. | |
| 8,081,400 B1 | * | 12/2011 | Hu | G11B 5/6082 360/236.3 |
| 8,184,405 B1 | * | 5/2012 | Zheng | G11B 5/6082 360/266.3 |

(Continued)

*Primary Examiner* — William J Klimowicz
(74) *Attorney, Agent, or Firm* — Hall Estill Attorneys at Law

(57) ABSTRACT

A data storage device may be configured with a transducing head mounted to a slider. The slider may be suspended above a magnetic data storage medium and have a variable depth region, central rail wall, first wall, and trailing edge wall. The variable depth region continuously contacting a central rail wall from a first wall to a trailing edge wall.

20 Claims, 6 Drawing Sheets

(56) References Cited

U.S. PATENT DOCUMENTS

| | | | |
|---|---|---|---|
| 8,493,688 B2* | 7/2013 | Ambekar | G11B 5/6082 360/236.2 |
| 8,611,051 B1* | 12/2013 | Hanyu | G11B 5/6082 360/236.3 |
| 8,810,967 B2 | 8/2014 | Ramakrishnan et al. | |
| 9,449,630 B2 | 9/2016 | Rajasekharan et al. | |
| 2002/0063995 A1* | 5/2002 | Sannino | G11B 5/6005 360/236.3 |
| 2002/0075599 A1* | 6/2002 | Rao | G11B 5/6005 360/235.7 |
| 2002/0075600 A1* | 6/2002 | Schnur | G11B 5/6005 360/235.8 |
| 2002/0109941 A1* | 8/2002 | Chapin | G11B 5/6082 360/235.7 |
| 2004/0012887 A1* | 1/2004 | Rajakumar | G11B 5/6005 360/236.2 |
| 2004/0090709 A1* | 5/2004 | Mundt | G11B 5/6005 360/236.3 |
| 2004/0150916 A1* | 8/2004 | Rao | G11B 5/6005 360/235.8 |
| 2004/0201923 A1* | 10/2004 | Rao | G11B 5/3136 360/235.7 |
| 2004/0264053 A1* | 12/2004 | Pendray | G11B 5/54 360/236.3 |
| 2005/0190501 A1* | 9/2005 | Boutaghou | G11B 5/6082 360/236.2 |
| 2006/0176616 A1* | 8/2006 | Ueda | G11B 5/6082 360/236.3 |
| 2008/0259499 A1* | 10/2008 | Hu | G11B 5/6082 360/235.4 |
| 2009/0109573 A1* | 4/2009 | Li | G11B 5/60 360/235.5 |
| 2009/0310258 A1* | 12/2009 | Hanyu | G11B 5/6005 360/235.4 |
| 2010/0091405 A1* | 4/2010 | Huang | G11B 5/6005 360/235.4 |
| 2010/0091406 A1* | 4/2010 | Huang | G11B 5/6005 360/235.4 |
| 2010/0149692 A1* | 6/2010 | Fujimaki | G11B 5/6005 360/235.8 |
| 2010/0157480 A1* | 6/2010 | Watanabe | G11B 5/6005 360/235.4 |
| 2010/0302684 A1* | 12/2010 | Ruiz | G11B 5/102 360/235.4 |
| 2011/0032641 A1* | 2/2011 | Ookubo | G11B 5/6005 360/235.5 |
| 2011/0058275 A1* | 3/2011 | Kohira | G11B 5/6005 360/75 |
| 2011/0058278 A1* | 3/2011 | Sonda | G11B 5/6005 360/234.3 |
| 2011/0141622 A1* | 6/2011 | Takeuchi | G11B 5/6005 360/235.4 |
| 2011/0157748 A1* | 6/2011 | Hanyu | G11B 5/6005 360/235.4 |
| 2012/0002327 A1* | 1/2012 | Hanyu | G11B 5/6082 360/235.6 |
| 2012/0050918 A1* | 3/2012 | Ambekar | G11B 5/6082 360/235.4 |
| 2012/0275063 A1* | 11/2012 | Sonoda | G11B 5/6082 360/236.5 |
| 2014/0168820 A1* | 6/2014 | Rajasekharan | G11B 5/6082 360/235.6 |
| 2015/0015989 A1* | 1/2015 | Sytine | G11B 5/6005 360/75 |
| 2015/0146322 A1* | 5/2015 | Bi | G11B 19/2009 360/99.08 |
| 2018/0361427 A1* | 12/2018 | Buettner | G03F 7/0002 |

* cited by examiner

ADVANCED AIR BEARING SLIDER

RELATED APPLICATION

The present application makes a claim of domestic priority to U.S. Provisional Patent Application No. 62/655,336 filed Apr. 10, 2018, the contents of which are hereby incorporated by reference.

SUMMARY

A data storage device, in accordance with some embodiments, has a transducing head mounted to a slider suspended above a magnetic data storage medium. The slider having a variable depth region continuously contacting a central rail wall from a first wall to a trailing edge wall.

DETAILED DESCRIPTION

In an effort to increase the data capacity of data storage devices with rotating magnetic media, operating tolerances have decreased. Anticipation of variances within, and outside of, tight operating tolerance ranges has emphasized the mitigation of performance degrading operating variances instead of prevention of such variances. However, mitigation of physical reactions to operating variances can be difficult in components that have small physical shapes and dynamic operating requirements. Hence, various embodiments are generally directed to a slider of a data storage device configured to provide an advanced air bearing that mitigates physical reactions to operating variances.

Figure 1:
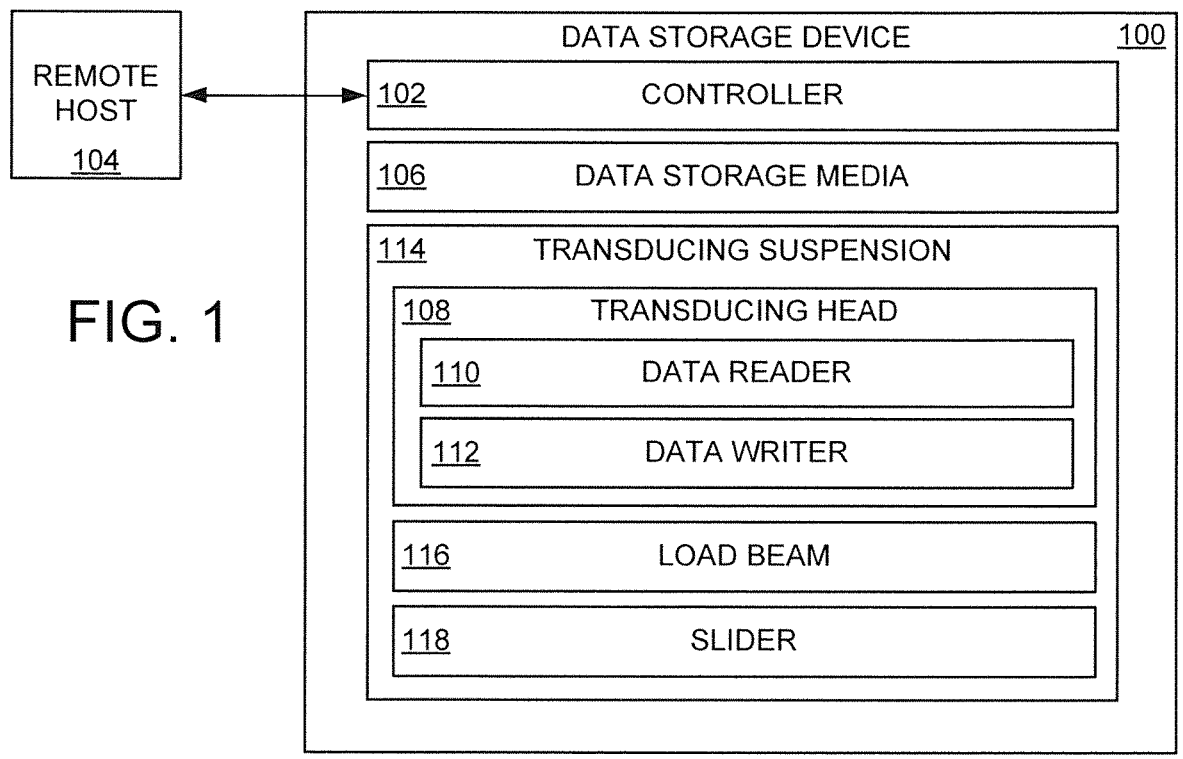
FIG. 1 is a block representation of an example data storage device in which various embodiments are practiced.

An example data storage device 100 where various embodiments of the present disclosure can be practiced is represented in FIG. 1. The data storage device 100 has a local controller 102 that can direct data accesses and maintenance to service one or more remote hosts 104 with optimized performance. The local controller 102 may be any logic circuit, such as a microprocessor or programmable control module, that orchestrates engagement of at least one rotating magnetic media 106 with at least one transducing head 108 to conduct data reads with a data reader 110 and data writes with a data writer 112.

Data access operations conducted by the local controller 102 can correspond with the transducing head 108 being suspended over a physical address on a data storage medium 106 by a transducing suspension 114. While not limiting, the transducing suspension 114 can have an actuating load beam 116 physically connected to a slider 118 where the transducing head 108 is located. It is noted that the load beam 116, slider 118, data reader 110, and data writer 112 may collectively be considered a head-gimbal assembly.

Figure 2:
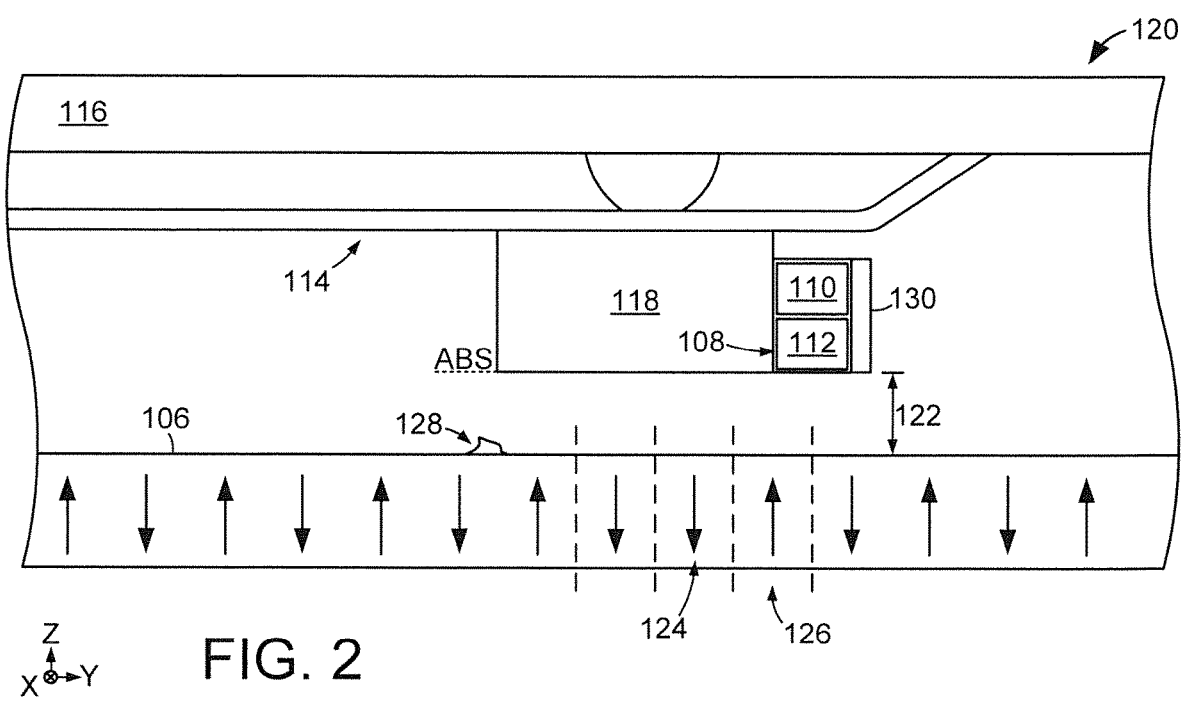
FIG. 2 represents portions of an example data storage device arranged and operated in accordance with some embodiments.

FIG. 2 is a line representation of a portion of an example data storage device 120 arranged in accordance with assorted embodiments. A transducing head 108 is suspended above a data storage medium 106 by a predetermined air bearing size 122 by slider 118 and load beam 118 aspects of a transducing suspension 114. The transducing suspension 114 can be configured to move manually, and automatically to position the transducing head 108 over a selected data bit 124 resident in a data track 126.

The shape, size, and configuration of the slider 118 can dictate how the transducing head 108 flies above the data storage medium 106. While various technologies arrange the slider 118 to prevent contact of the transducing head 108 with the medium 106, it is noted that head-medium contact is often inevitable due to operational variations of the transducing suspension 114, the presence of thermal asperities 128, and unexpected external shock to the data storage device 120. Thus, various embodiments are directed to increasing slider damping of movement and vibration to reduce transducing head 108 oscillation times in response to head-medium contact for any reason.

In an effort to increase data storage performance, the thickness of an overcoat layer, as measured parallel to the Y axis, can be reduced along with the unused padding between data tracks 126. This results in a loss of margin due to thermal asperity 128 interaction with the slider 114 and/or head 108. Physical contact of a thermal asperity 128 and a transducing head 108 can be particularly detrimental to performance if the asperity is not previously known, mapped, or classified. Hence, the detection of thermal asperities 128 allows the effects of head-medium contact to be mitigated.

While altering the shape, size, or configuration of the slider 114 can increase resiliency to head-medium contact events, such alterations can compromise the ability to detect thermal asperities 128 and/or head-medium contact. For instance, configuring the slider 114 with to increase stiffness can alter pressurization along the air bearing surface (ABS) in a manner that degrades detection of head-medium contact along with the ability to set and maintain a target air bearing size 122. Accordingly, various embodiments configure the slider 114 to provide high damping of the transducing head 108 without degrading air bearing pressurization or head-medium contact detection.

Figure 3A:
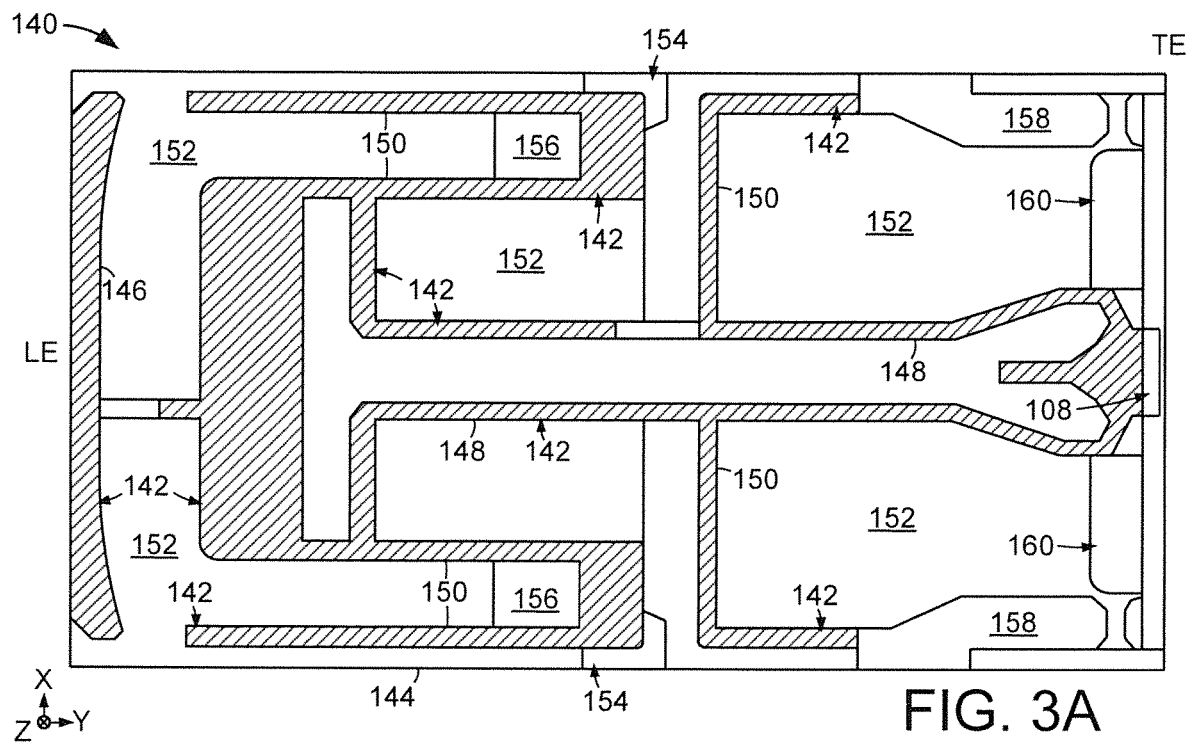
FIGS. 3A-3G respectively show bottom view line representations of example sliders that may be used in the data storage device of FIGS. 1 & 2.

FIGS. 3A-3G respectively convey air bearing view line representations of portions of example sliders arranged in accordance with various embodiments. FIG. 3A is a slider 140 on which a transducing head 108 is mounted. The slider 140 has a variety of walls 142, as illustrated in cross-hatch, that each continuously extend from a slider body 144 to a uniform height along the Z axis. A leading edge (LE) wall 146 can operate with a center rail wall 148 and stabilizing wall 150, as shown, to control the flow of fluid and the pressurization of the air bearing side of the slider 140.

It is contemplated that the floor surface 152 of the slider body 144 is a single uniform distance from the top of the respective walls 142. However, some embodiments create a contoured slider floor 152 that has two different depths, as measured from the ABS at the top of the respective walls 142. Although not limiting, increased depth in regions 154, 156, 158, and 160 can increase the stability of the slider 140 during use. In yet, the varying depth of the slider floor 152 can degrade contact detection capability and data storage performance due to alteration of air bearing surface pressurization and slider operation modes.

Figure 3B:
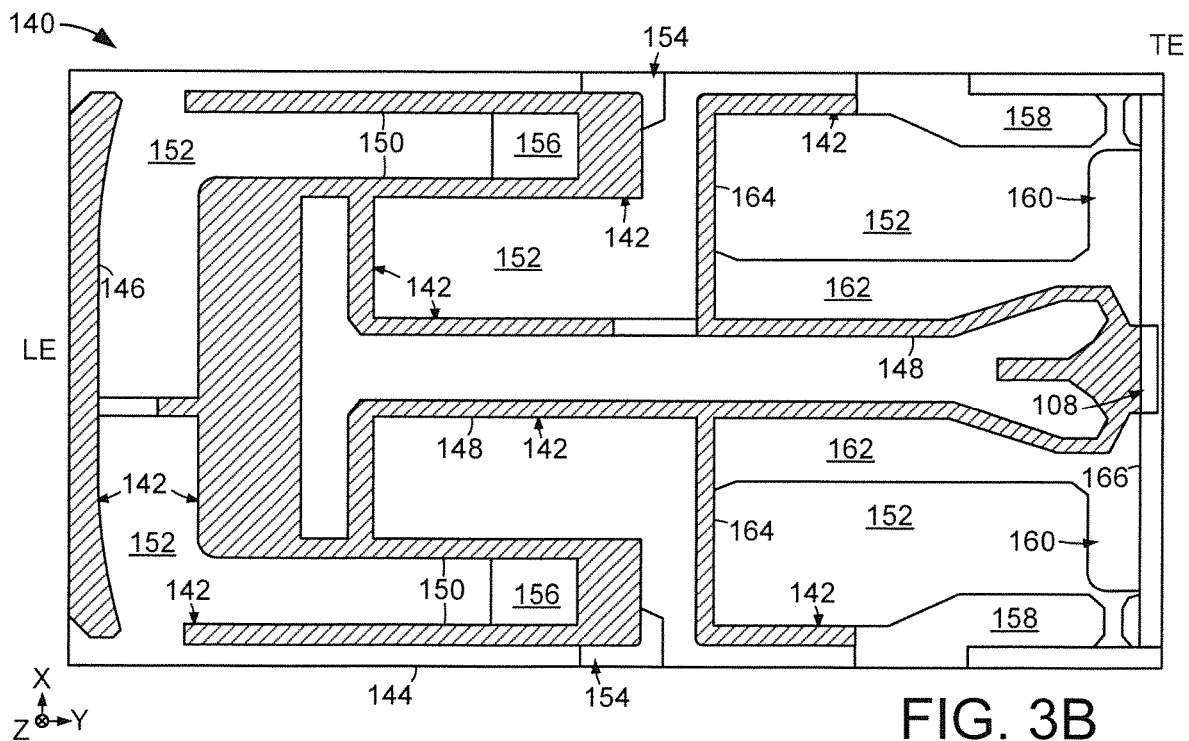

With these issues in mind, assorted embodiments configure the slider floor 152 with multiple different depths that operate to optimize air bearing pressurization about the center rail wall 148. FIG. 3B displays how an increased depth region 162 continuously extends from a leading edge wall 164 to the trailing edge wall 166 where the transducing head 108 is mounted. It is contemplated that the depth region 162 can be a single uniform depth or may consist of multiple different depths measured along the Z axis from the air bearing surface top of the center rail wall 148. The ability to customize multiple depths into the depth region 162 can provide different damping, stiffness, and pressurization profiles that reduce head oscillation time without adversely effecting detection of head-medium contact.

Figure 3C:
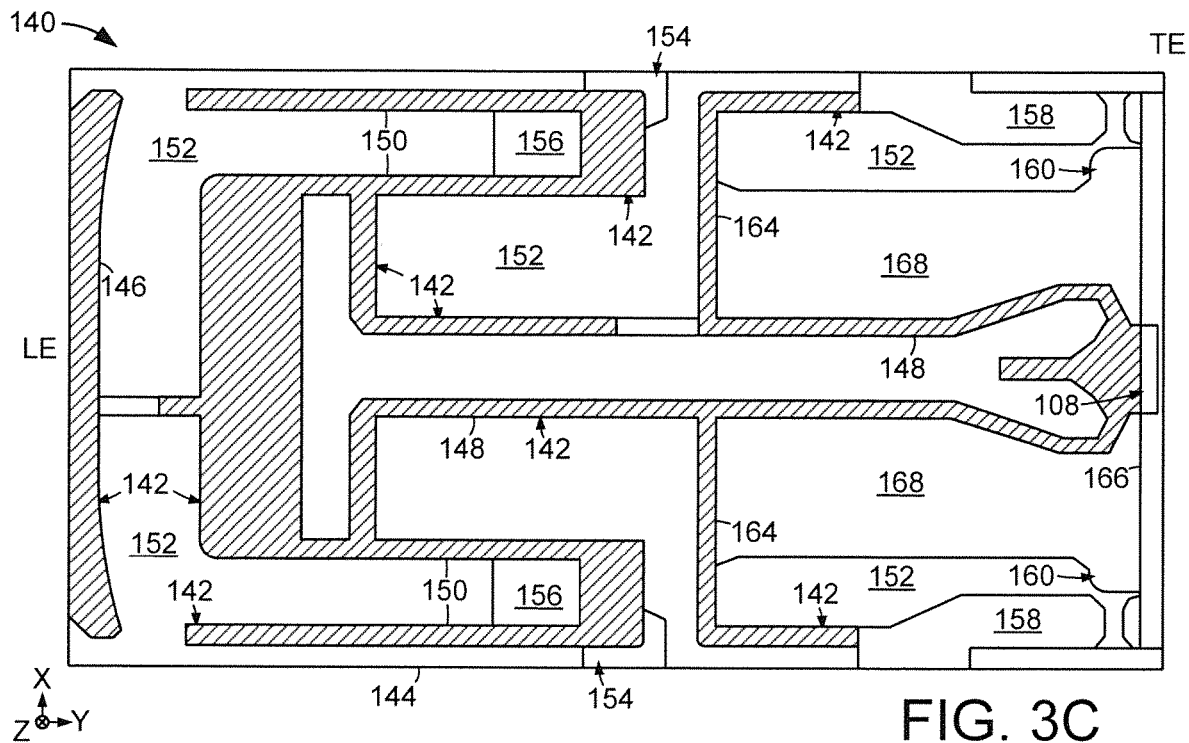

FIG. 3C illustrates an alternative depth region 168 where that is physically larger than region 162. The increased depth region 168 size along the Y axis can decrease the cumulative energy of reader gain after an impulse along with reducing the pressure experienced at the trailing edge (TE) of the slider 140. Such decreased trailing edge pressure allows for reliable head-medium contact detection as well as slider stability after an interaction with a thermal asperity, lube ridges, grease droplets, and other defects on the air bearing surface of the data storage medium.

By customizing pressurization, stiffness, and damping of a slider 140 with varying floor depths, the size of the air bearing can be reduced without degrading data storage performance. That is, the increased damping provided by the optimized pressurization of the depth regions 162/168 allow the slider 140 to physically contact thermal asperities and other media defects with increased robustness and damping that do not degrade data storage reliability.

Figure 3D:
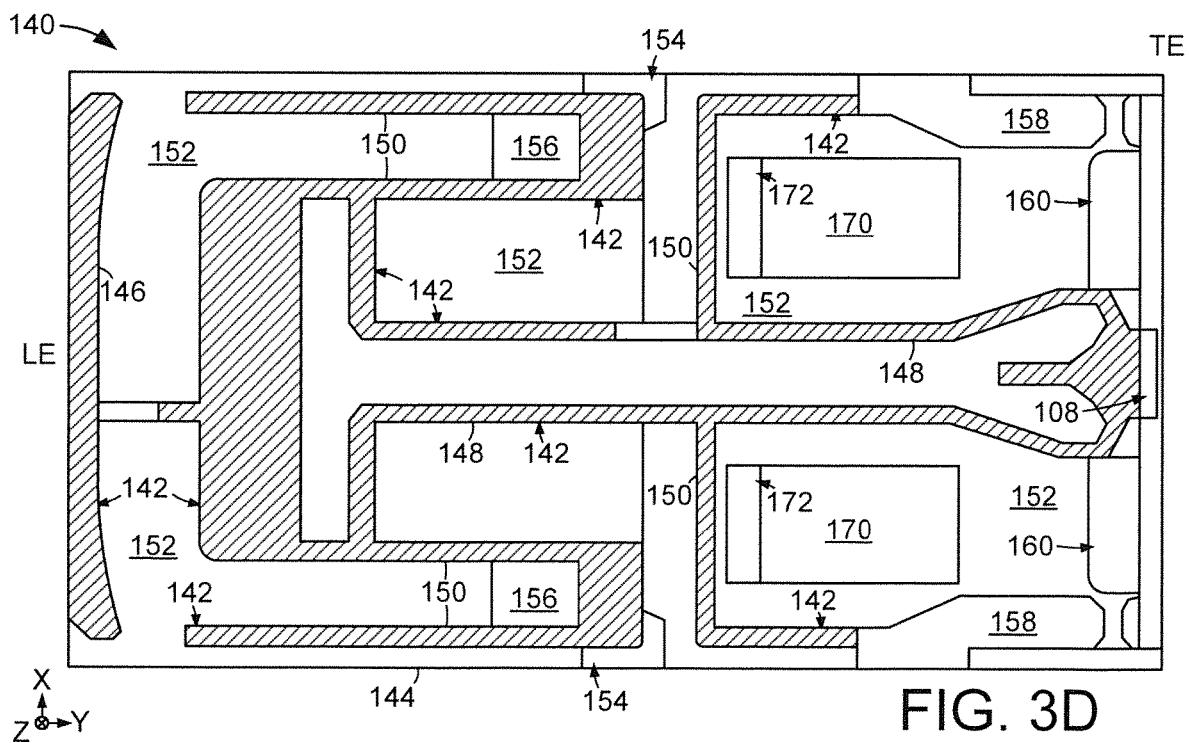
Figure 3E:
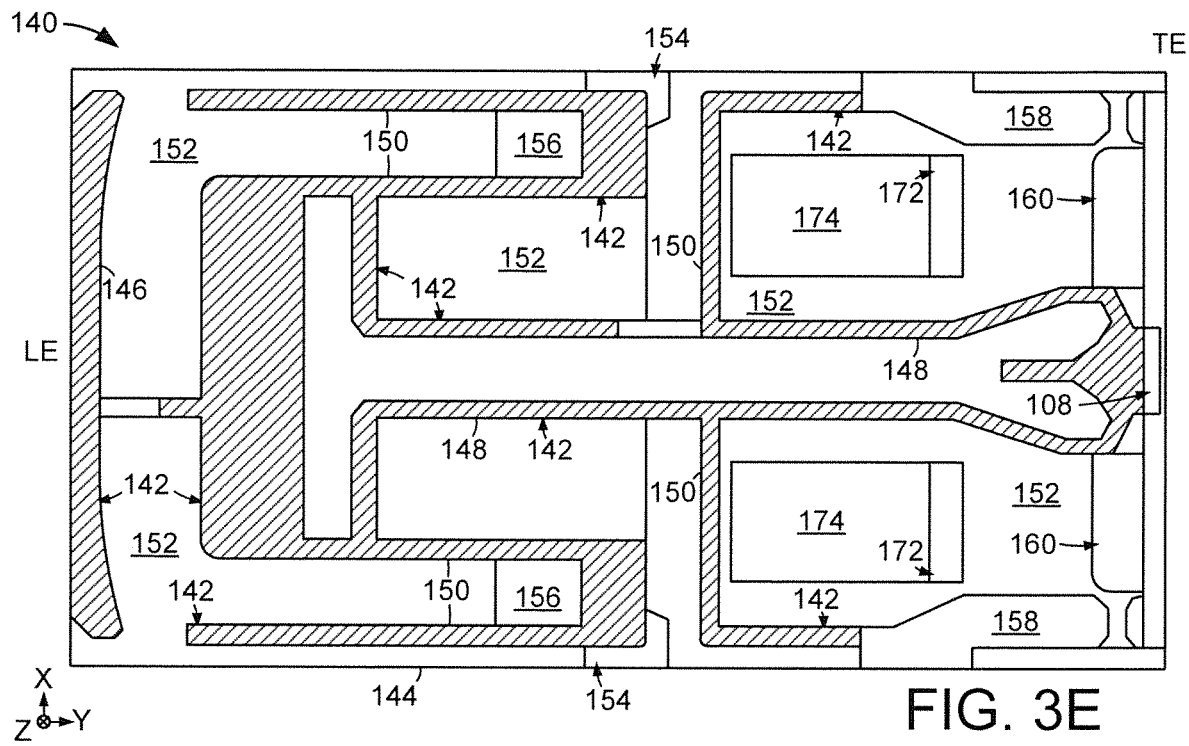

FIGS. 3D-3G respectively illustrate various slider floor configurations that employ multiple different floor depths in multiple separated regions. FIG. 3D displays how a depth region 170 can be positioned on the trailing edge side of a wall 172 on opposite sides of the center rail wall 148. The wall 172 can have any size, shape, and height that operates in conjunction with the depth region 170 to consistently control pressurization, stiffness, and damping of the slider 140. FIG. 3E depicts how a depth region 174 can be positioned on the leading edge side of the wall 172 of FIG. 3D. By flipping the location of the depth region 174 relative to the wall 172 in FIGS. 3D and 3E, damping can be altered to cater to the structural and/or operational environment in which the slider 140 is to be employed.

Figure 3F:
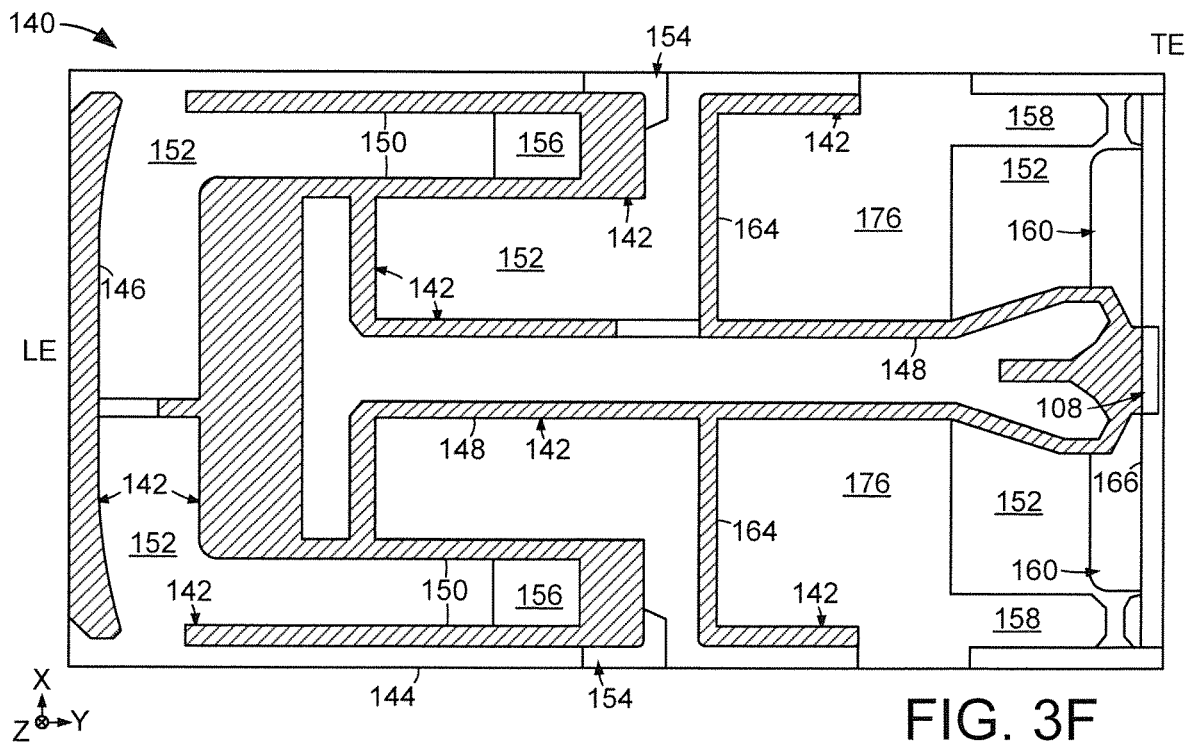
Figure 3G:
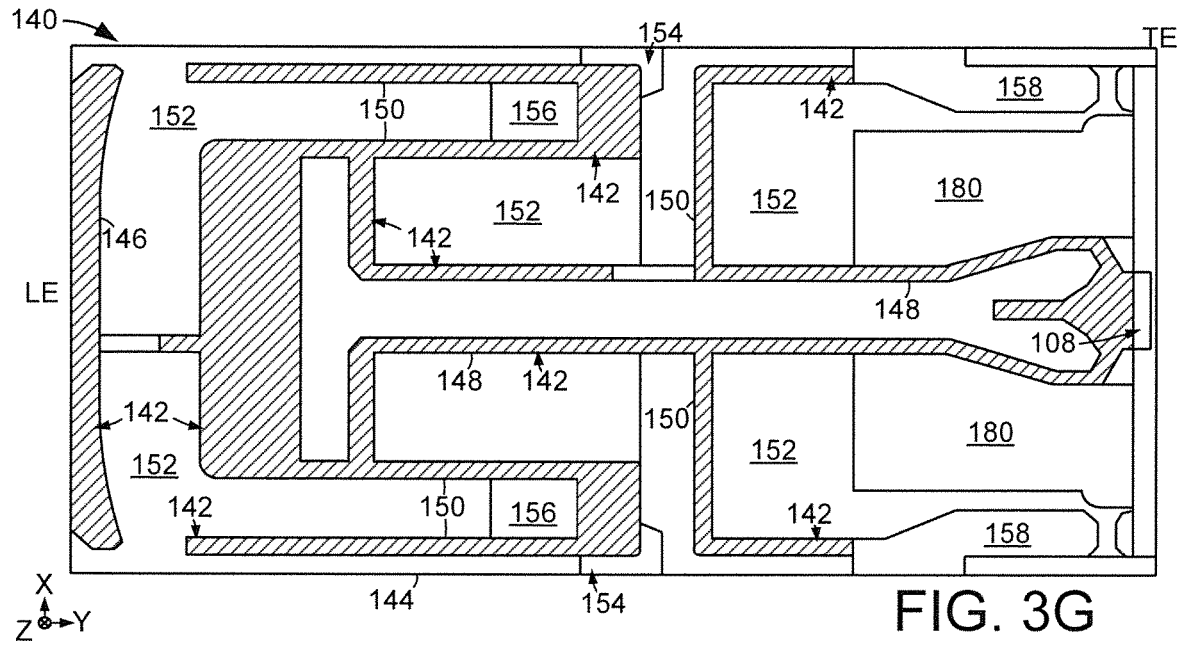

While additional walls 172 can be incorporated into the slider 140, pressurization and damping control may also be achieved by customizing the size and shape of a varying floor depth region. FIG. 3F displays how a depth region 176 can continuously extend and contact the wall 164. It is noted that depth region 176 can comprise multiple different depths, or a single uniform depth, that may be lower, or higher, than the slider floor 152. The depth region 176 in FIG. 3F is physically separate from the depth region 160 contacting the trailing edge wall 166. The depth region 180 of FIG. 3G shows how a depth region 178 can be separate from region 158 and continuously extend from region 160. The ability to configure depth regions in a variety of different manners, as generally conveyed in FIGS. 3A-3G, allows the slider 140 to employ pressurization and damping optimization for a diverse variety of operating conditions.

With the various depth regions (154/156/158/160/162/168/170/174/176/178) of FIGS. 3A-3G, the slider floor 152 is altered to be higher or lower, as measured along the Z axis. The assorted depth regions can employ linear surfaces, curvilinear surfaces, and combinations thereof to further tune the manner in which fluid flows over the slider 140, pressure zones are created, and vibrations are damped. The various depth regions may be configured with surfaces that are tilted at a non-normal angle with respect to the Z axis, which also allows for pressurization and damping customization.

Figure 4A:
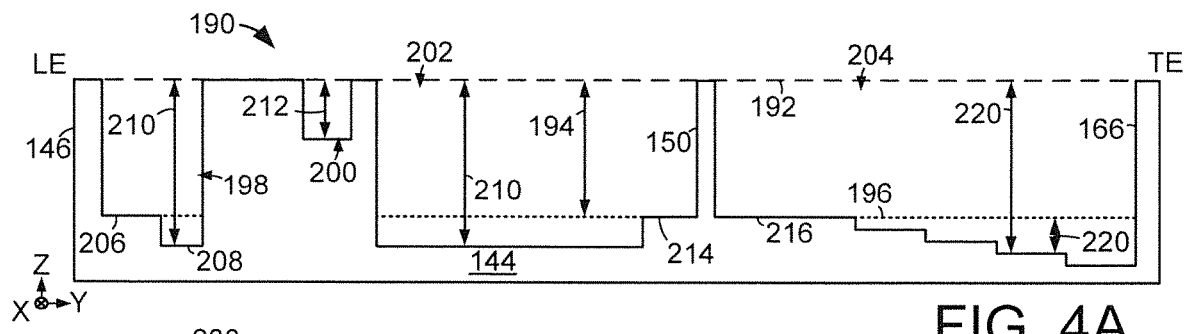
FIGS. 4A-4C respectively convey cross-sectional line representations of example slider configured in accordance with various embodiments.
Figure 4B:
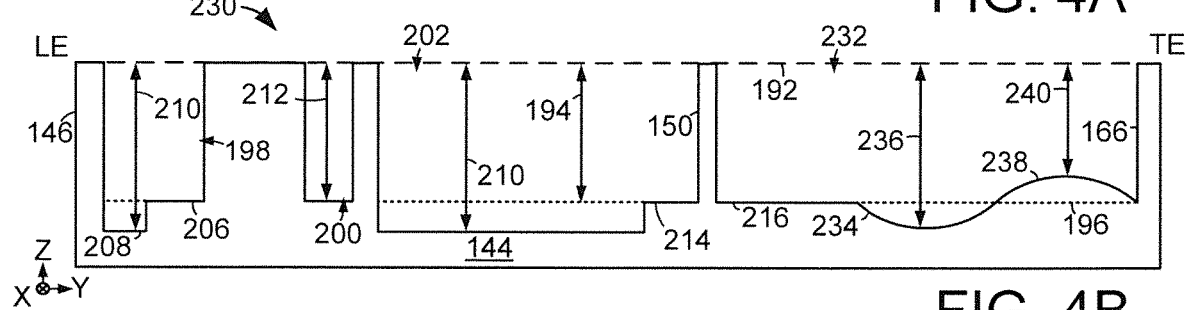
Figure 4C:
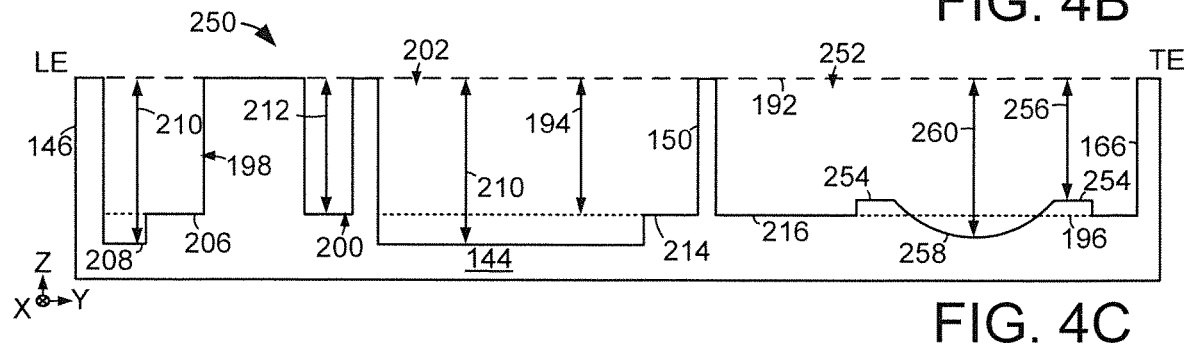

FIGS. 4A-4C respectively display cross-sectional view line representations of example sliders that can utilize the configurations of FIGS. 3A-3G as part of the data storage device of FIGS. 1 & 2. In FIG. 4A, the topography of an example slider 190 is conveyed. The slider 190 has the same walls 146, 150, and 166 as slider 140 of FIGS. 3A-3G that continuously extend from a slider body 144 to a uniform elevation indicated by segmented line 192. The slider 190 can have any number of differently configured depth regions that respectively have surfaces above, and/or below, a floor depth 194, as measured from the uniform elevation 192 to segmented line 196.

As shown, a first depth region 198 can be positioned proximal the leading edge of the slider 190, a rail depth region 200, a second depth region 202, and a third depth region 204. While any depth region 198/200/202/204 can have a single uniform depth, such as the floor depth 194, or have a varying depth defined by multiple floor surfaces. The first depth region 198 has a first surface 206 at floor depth 194 and a second surface 208 having a first lower depth 210. The rail depth region 200 has a uniform depth 212 that is smaller than the floor depth 194. The first lower depth 210 is present in the second depth region 202 along with the floor depth 194 via the third surface 214.

The third depth region 204 has a fourth surface 216 aligned with the floor depth 194 that transitions into a plurality of stepped surfaces that gradually increase distance 218 below the floor depth 194. As a result, each stepped surface has a depth 220 that is greater than the floor depth 194. The example slider 230 of FIG. 4B illustrates how the rail depth region 200 can extend to floor depth 194 and the surfaces 206/208 of the first depth region 198 can be reversed. Slider 230 has a fourth depth region 232 that employs the fourth surface 216 transitioning into a first curvilinear surface 234 that continuously has a greater-than-floor depth 236 and into a second curvilinear surface 238 that continuously has a less-than-floor depth 240.

FIG. 4C displays an example slider 250 that has a fifth depth region 252 customized with pedestal surfaces 254 that have a less-than-floor depth 256 transitioning into a curvilinear surface 258 that has a varying depth 260 that extends both above and below the floor depth 194. The various depth region configurations of FIGS. 4A-4C are not required or limiting and serve to illustrate example topography that can be employed by a slider to optimize pressurization and damping without degrading head-medium contact detection capabilities.

Figure 5:
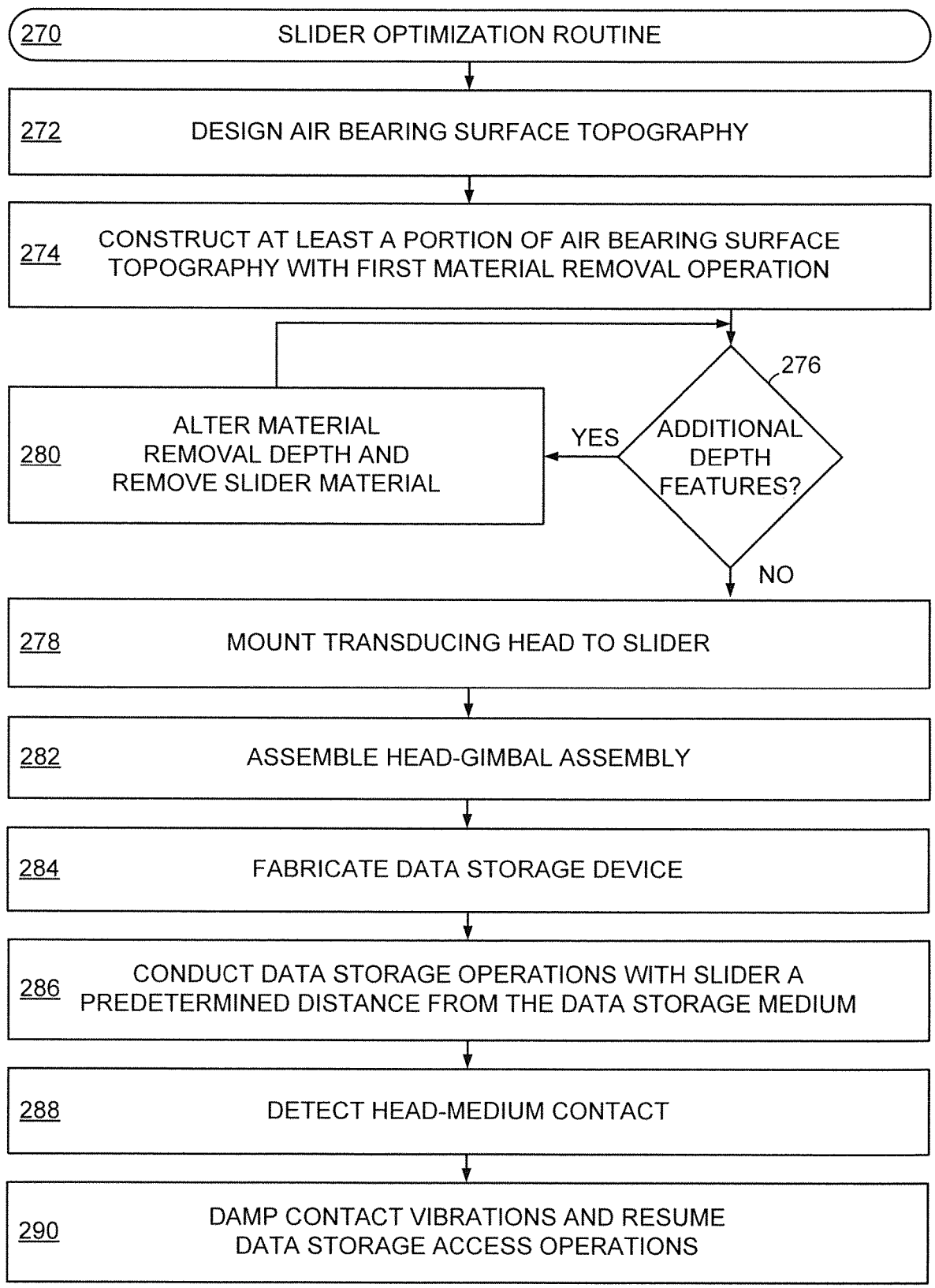
FIG. 5 provides an example slider optimization routine carried out with the assorted embodiments of FIGS. 1-4C.

FIG. 5 is a flowchart of an example slider optimization routine 270 that can be carried out in accordance with various embodiments of FIGS. 3A-4C to provide the data storage device of FIGS. 1-2. The routine 270 can begin with step 272 designing an air bearing surface topography for a slider that provides pressurization and damping characteristics conducive to optimized data storage performance. The air bearing surface topography can, in some embodiments, consist of a number of walls and depth regions, as generally illustrated in FIGS. 3A-4C.

Step 274 proceeds to construct at least a portion of the air bearing surface topography with a first material removal operation to a first depth into the slider. Next, routine 270 evaluates if additional depths are to be formed in the slider with decision 276. It is contemplated that the slider has only one depth and decision 276 would advance to step 278 where a transducing head is mounted onto a trailing edge of the slider.

In the event additional depths are to be constructed to form the air bearing surface topography designed in step 272, decision 276 executes step 280 to alter the material removal operation depth of step 274 and subsequently remove slider material to that altered depth. Decision 276 can trigger step 274 any number of times to fabricate any number of slider surfaces residing at any depth below the top of the slider, which coincides with uniform elevation 192 of FIGS. 4A-4C.

When the prescribed number of depths, depth surfaces, and depth regions have been created to satisfy the design of step 272, decision 276 mounts a transducing head in step 278 and then assembles the slider into a head-gimbal assembly and transducing suspension in step 282. Further assembly in step 284 fabricates a data storage device that is utilized in step 286 to conduct data storage operations, such as data reads and data writes, by flying the slider and transducing head a predetermined air bearing distance from a rotating data storage medium. During step 286, it is contemplated that step 288 experiences slider and/or head physical contact with a portion of the medium that is detected by a local controller connected to the transducing head. Such contact is then mitigated in step 290 by damping the resulting vibration and movement from the contact of step 288 while maintaining air bearing pressurization that allows the slider/head to quickly resume accurate data access operations a predetermined distance from the data storage medium.

Through the assorted slider embodiments, an advanced air bearing is created that provides heightened damping along with optimized air bearing pressurization. As a result, the reliability of a transducing head can be increased despite head-medium contact events that would otherwise jeopardize the integrity of data storage components and operations. The ability to optimize slider damping and pressurization while maintaining head-medium contact detection capabilities allows a data storage device to return to accurate data access operations after a head-medium contact event faster than if no contact detection occurred. By customizing the air bearing topography of a slider, pressurization can increase contact damping without degrading data sensing modes or maintenance of target air bearing size, which optimizes data access accuracy and reliability despite reduced head overcoat thickness.

It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present technology to the full extent indicated by the broad general meaning of the terms in which the appended claims are expressed. For example, the particular elements may vary depending on the particular application without departing from the spirit and scope of the present disclosure.

What is claimed is:

1. An apparatus comprising a transducing head mounted to a slider, the slider suspended above a magnetic data storage medium, the slider having a variable depth region continuously contacting a central rail wall from a first wall to a trailing edge wall, the variable depth region comprising a floor region and a curvilinear region, the floor region defined by a linear surface, the curvilinear region defined by a first continuously curvilinear surface contacting a second continuously curvilinear surface, the first continuously curvilinear surface having a first variable depth continuously extending to greater than a uniform depth from an air bearing surface, the second continuously curvilinear surface having a second variable depth continuously extending to less than the uniform depth.

2. The apparatus of claim 1, wherein the linear surface contacts the central rail wall, first wall, and trailing edge wall.

3. The apparatus of claim 1, wherein the linear surface has a uniform depth from the air bearing surface of the slider.

4. The apparatus of claim 1, wherein the linear surface is aligned with and parallel to the uniform depth from the air bearing surface.

5. The apparatus of claim 1, wherein the first consistently curvilinear surface and second consistently curvilinear surface collectively extend to less than a distance from the trailing edge wall to the first wall.

6. The apparatus of claim 1, wherein the first consistently curvilinear surface and second consistently curvilinear surface each continually contact the central rail wall.

7. The apparatus of claim 1, wherein the variable depth region comprises a combination of continuously linear and continuously curvilinear surfaces.

8. The apparatus of claim 1, wherein the second consistently curvilinear surface is positioned between the first consistently curvilinear surface and the trailing edge wall.

9. The apparatus of claim 8, wherein the second consistently curvilinear surface contacts the trailing edge wall.

10. The apparatus of claim 1, wherein the linear surface contacts and extends from the first wall.

11. A data storage device comprising a transducing head mounted to a slider, the slider suspended above a magnetic data storage medium, the slider having a first variable depth region continuously contacting a central rail wall from a first wall to a trailing edge wall and a second variable depth region continuously contacting a leading edge wall, the first variable depth region comprising a floor region and a curvilinear region, the floor region defined by a first linear surface, the curvilinear region defined by a first continuously curvilinear surface contacting a second continuously curvilinear surface, the first continuously curvilinear surface having a first variable depth continuously extending to greater than a uniform depth from an air bearing surface, the second continuously curvilinear surface having a second variable depth continuously extending to less than the uniform depth.

12. The data storage device of claim 11, wherein the second variable depth region comprises a second linear surface positioned below the uniform depth, as measured from a uniform elevation of the central rail wall, first wall, and leading edge wall.

13. The data storage device of claim 12, wherein the second variable depth region comprises a third linear surface aligned with the uniform depth.

14. The data storage device of claim 11, wherein the slider has a third variable depth region continuously contacting the central rail and separated from the first variable depth region by a stabilizing wall.

15. The data storage device of claim 14, wherein the third variable depth region comprises a second linear surface positioned below the uniform depth, as measured from a uniform elevation of the central rail wall, first wall, and stabilizing wall.

16. The data storage device of claim 15, wherein the third variable depth region comprises a third linear surface aligned with the uniform depth.

17. The data storage device of claim 14, wherein the first variable depth region is separated from the third variable depth region by the second variable depth region.

18. The data storage device of claim 11, wherein the first consistently curvilinear surface and second consistently curvilinear surface are each positioned only in the first variable depth region.

19. The data storage device of claim 11, wherein the first and second consistently curvilinear surfaces are symmetric about and on opposite sides of a floor plane aligned with the uniform depth, as measured from a uniform elevation of the central rail wall, first wall, and leading edge wall.

20. The data storage device of claim 11, wherein the first variable depth region has multiple linear surfaces.

\* \* \* \* \*